United States Patent
Kalsi et al.

(12)
(10) Patent No.: US 6,338,469 B1
(45) Date of Patent: Jan. 15, 2002

(54) FLEXIBLE WEDGE GATE VALVE

(75) Inventors: Manmohan Singh Kalsi, Houston; Patricio Daniel Alvarez, Richmond; Jaw-Kuang Wang, Sugar Land, all of TX (US)

(73) Assignee: Kalsi Engineering, Inc., Sugar Land, TX (US)

( * ) Notice: Subject to any disclaimer, the term of this patent is extended or adjusted under 35 U.S.C. 154(b) by 0 days.

(21) Appl. No.: 09/433,665

(22) Filed: Nov. 4, 1999

Related U.S. Application Data

(63) Continuation of application No. 08/787,454, filed on Jan. 22, 1997, now abandoned.

(51) Int. Cl.$^7$ .................................................. F16K 3/12
(52) U.S. Cl. ....................................... 251/326; 251/327
(58) Field of Search ................................ 251/324, 326, 251/327

(56) References Cited

U.S. PATENT DOCUMENTS 3,769,673 A  11/1973  Siepmann

FOREIGN PATENT DOCUMENTS

DE  2063036  7/1972
GB  705841  3/1954

*Primary Examiner*—John Fox
(74) *Attorney, Agent, or Firm*—James L. Jackson; Andrews & Kurth

(57) ABSTRACT

A wedge gate valve having a valve body defining a valve chamber and flow passages and upwardly diverging circular seat surfaces of circular, flat configuration and defining seat planes. A valve disk or wedge having downwardly converging sealing surfaces is movable within said valve chamber between open and closed positions for controlling flow through the valve. Pressure boundary plates connected by hubs to the valve disk define the sealing surfaces of the disk and have bottom corners that establish line contact with the downstream seat surface and prevent any portion of said sealing surfaces of said valve disk from crossing the sealing plane of the downstream seat in the event of flow responsive downstream movement of the valve disk during its opening and closing movement. Guide ears of the disk are provided with flexible upper and lower extremities and rounded or chamfered inner end surfaces to minimize localized peak contact stress with disk guide rails of the valve body. The center section of the disk is rendered flexible by the provision of an internal transverse cavity that extends completely through the center section or is located centrally of the center section to define flexible walls between the hubs to thus provide for disk flexibility for overcoming the tendency for disk binding. A valve actuator for opening and closing the valve disk is provided with an adjustable downstop to prevent overtravel of the disk during seating.

8 Claims, 13 Drawing Sheets

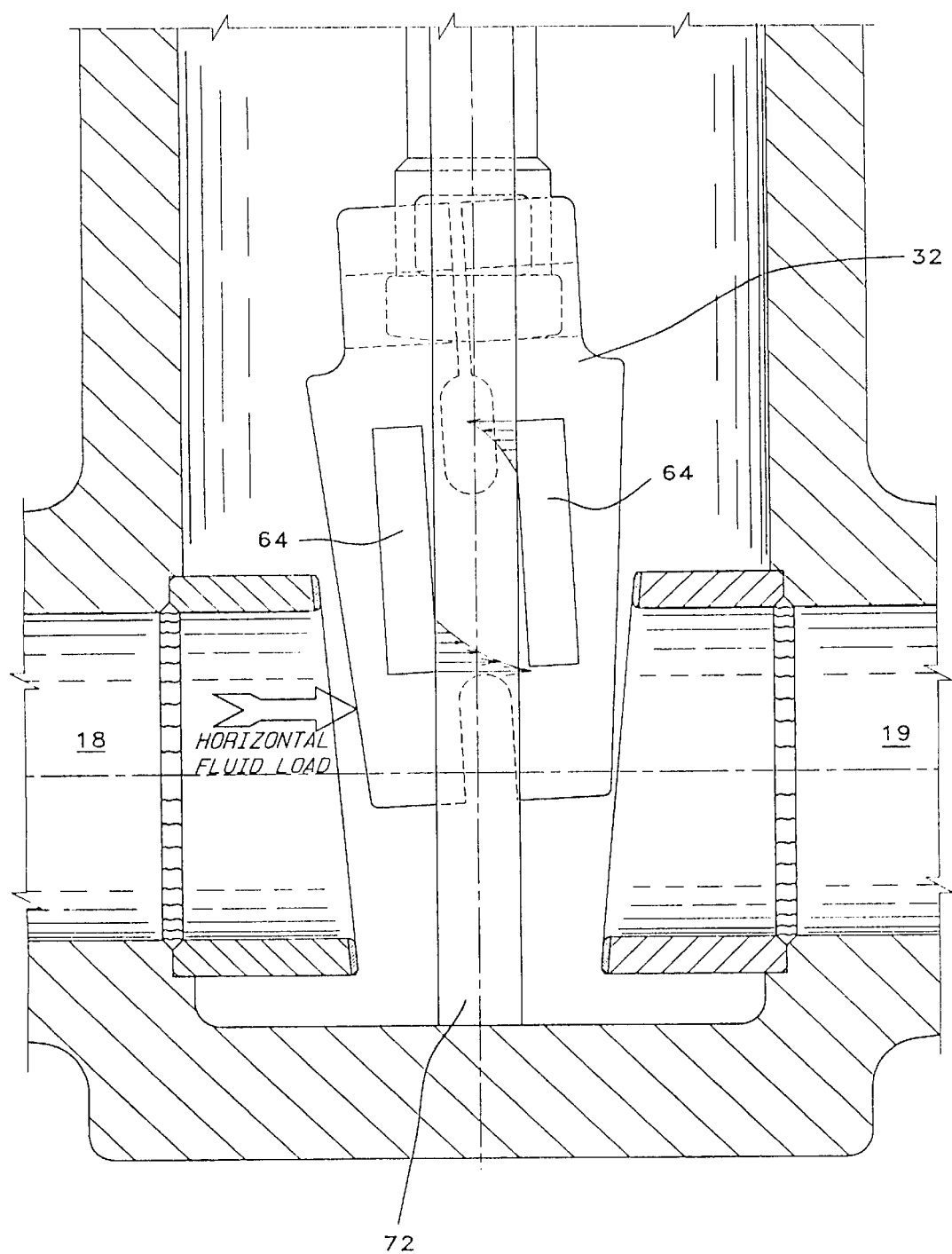

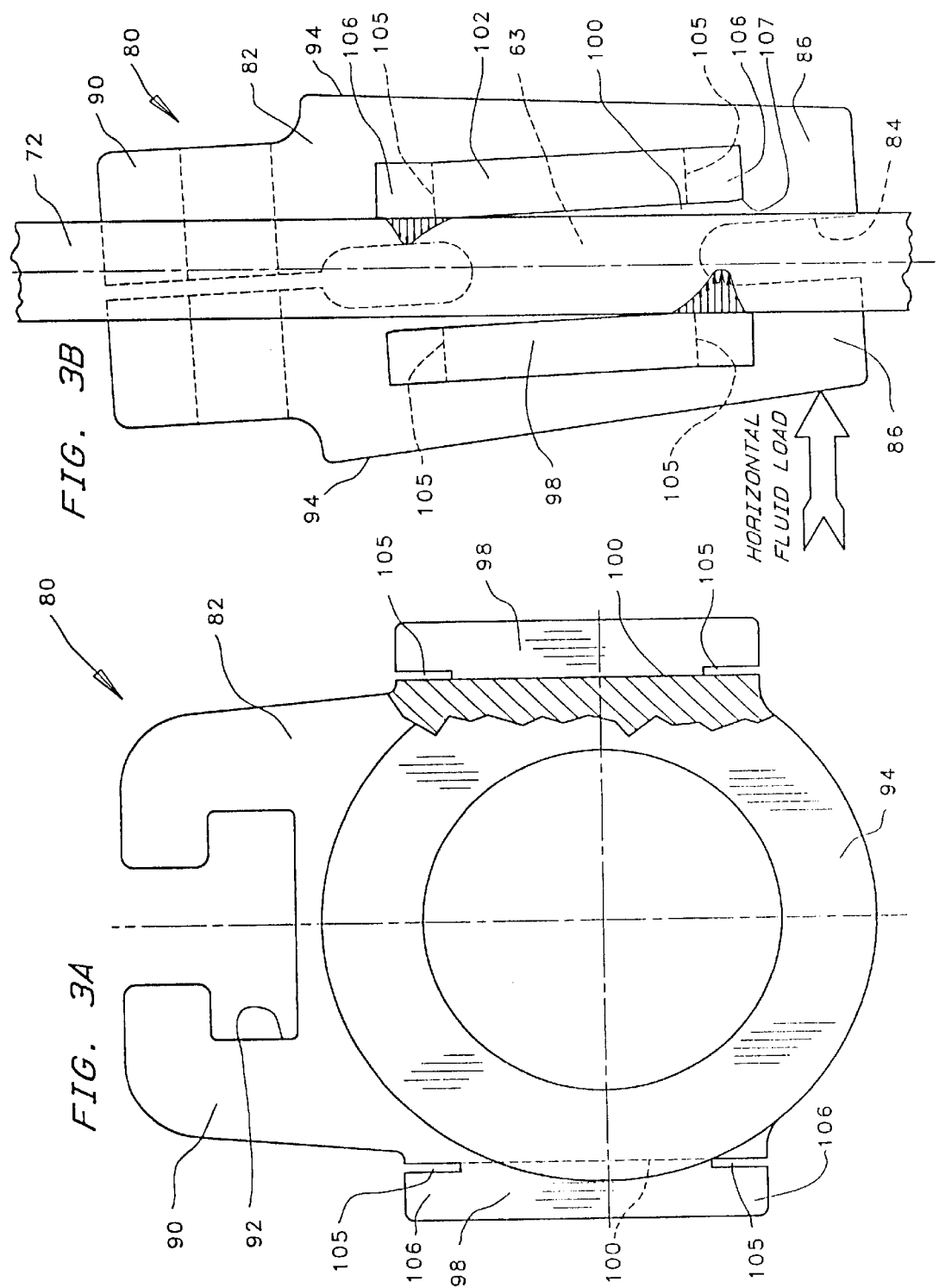

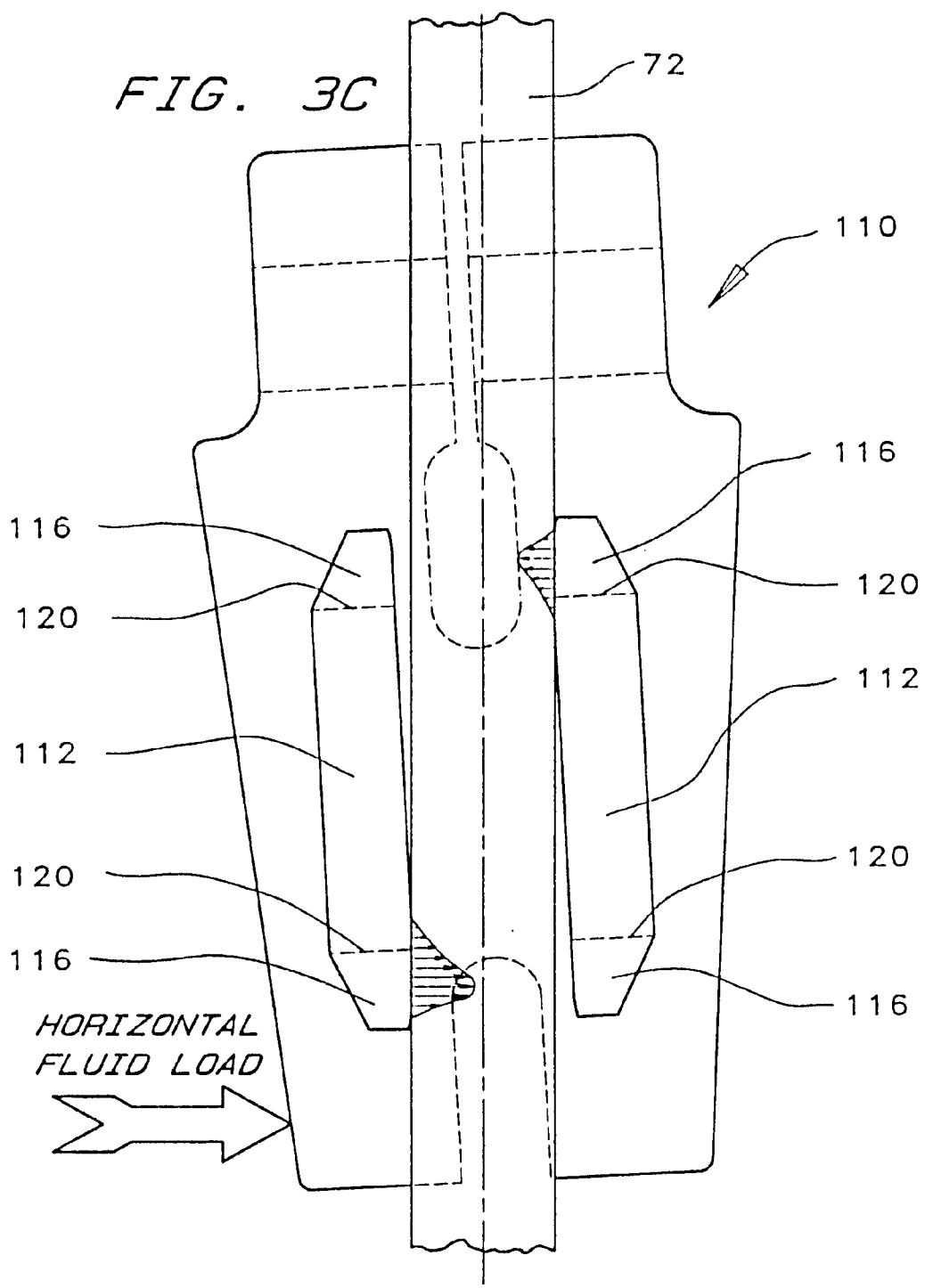

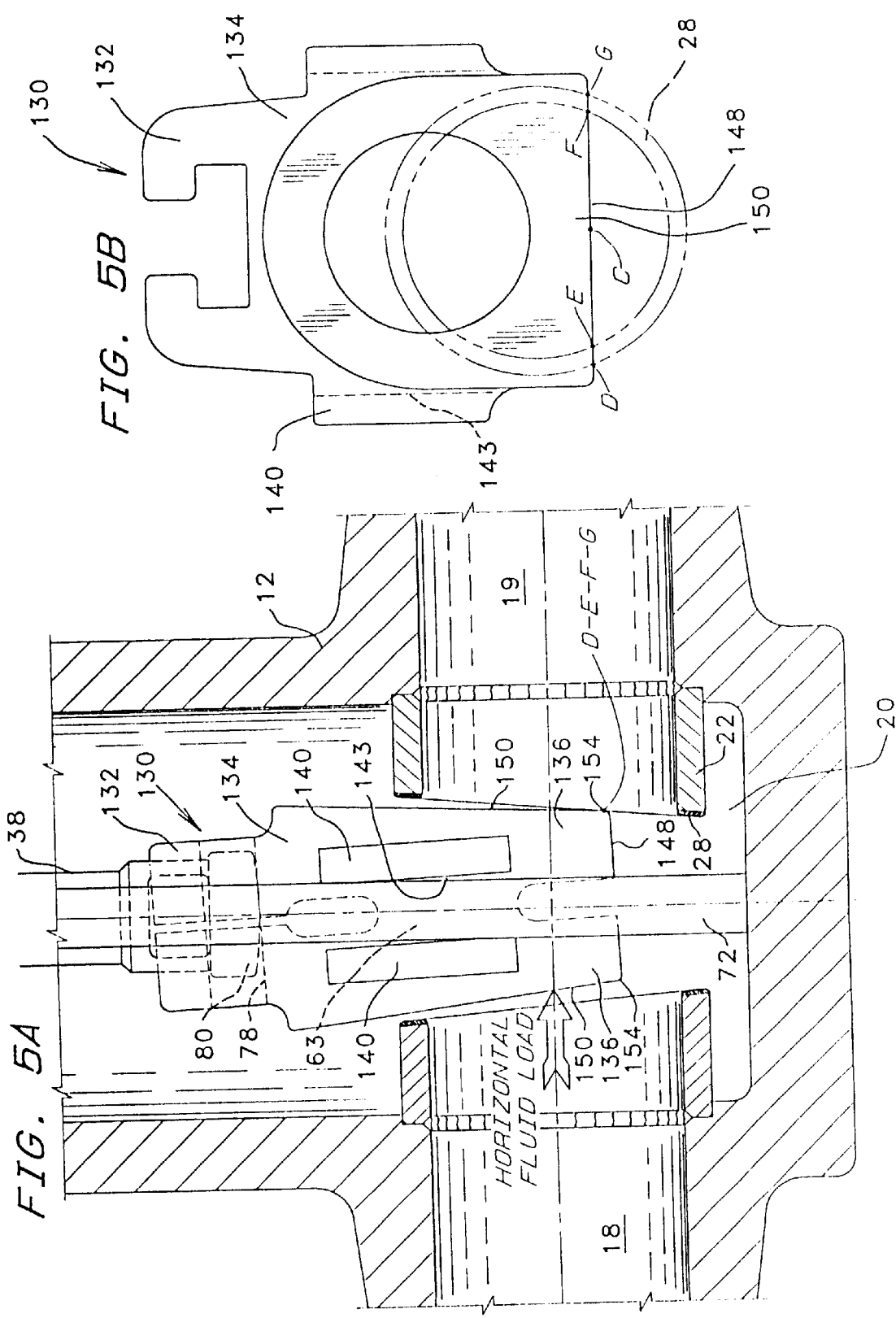

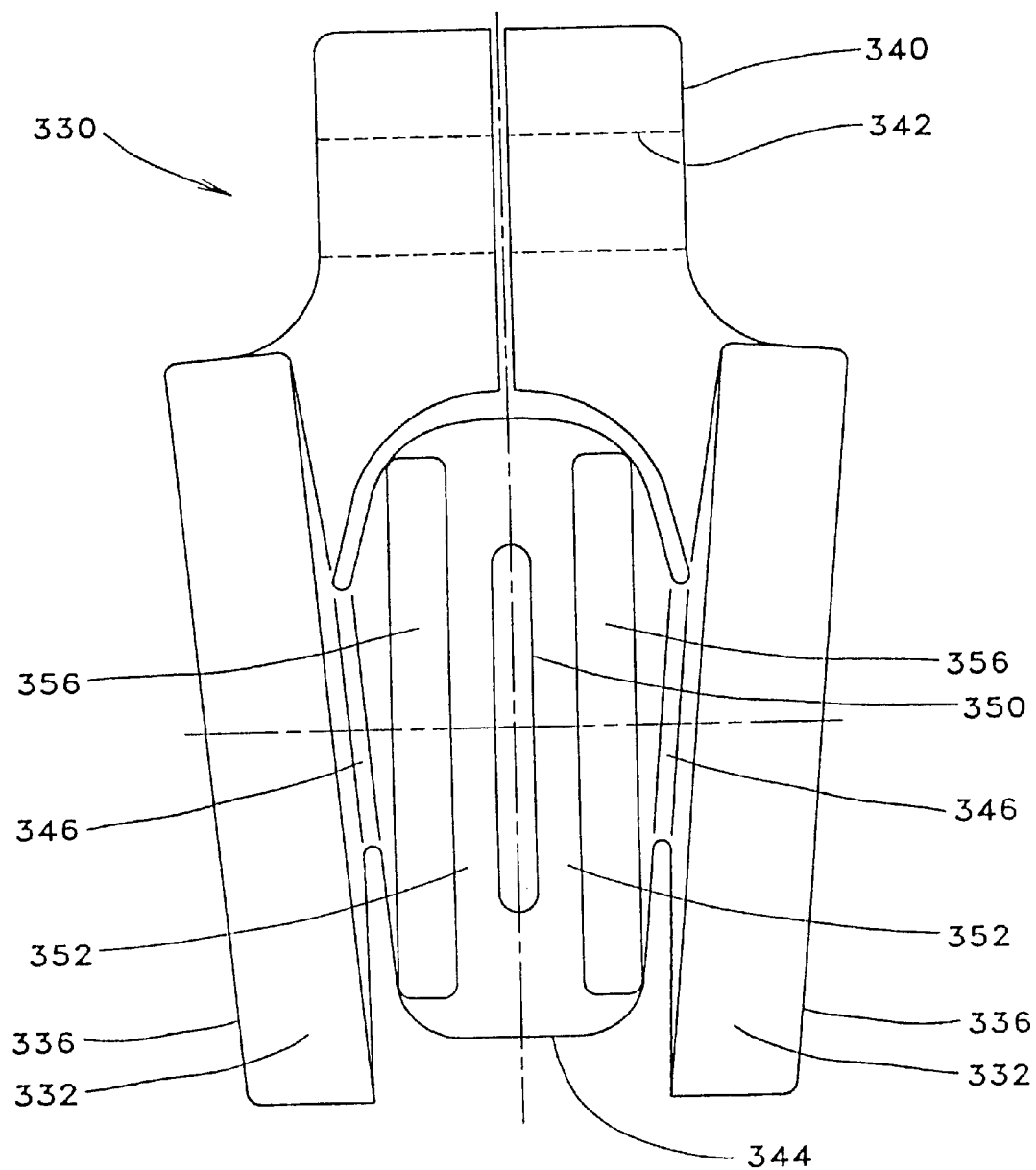

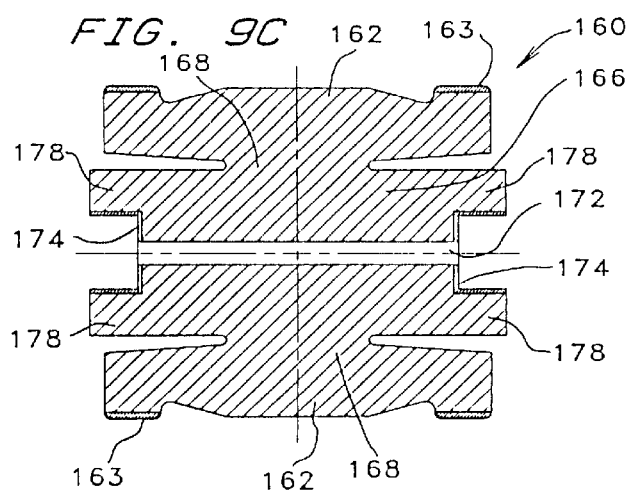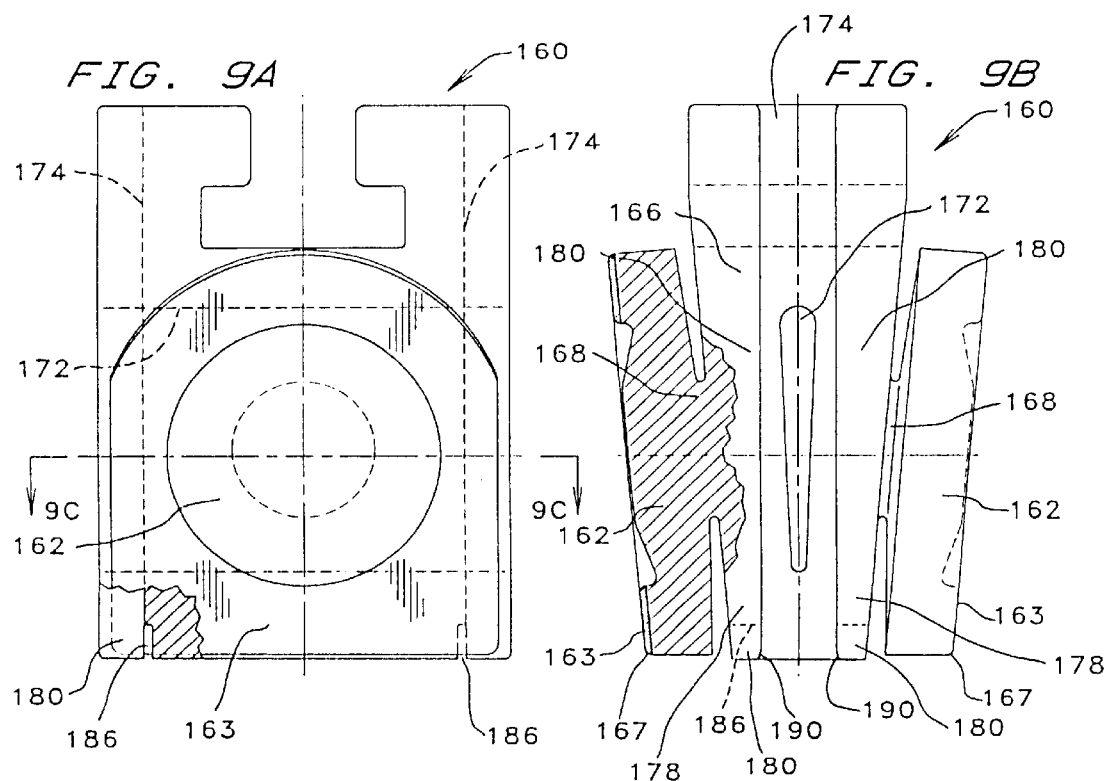

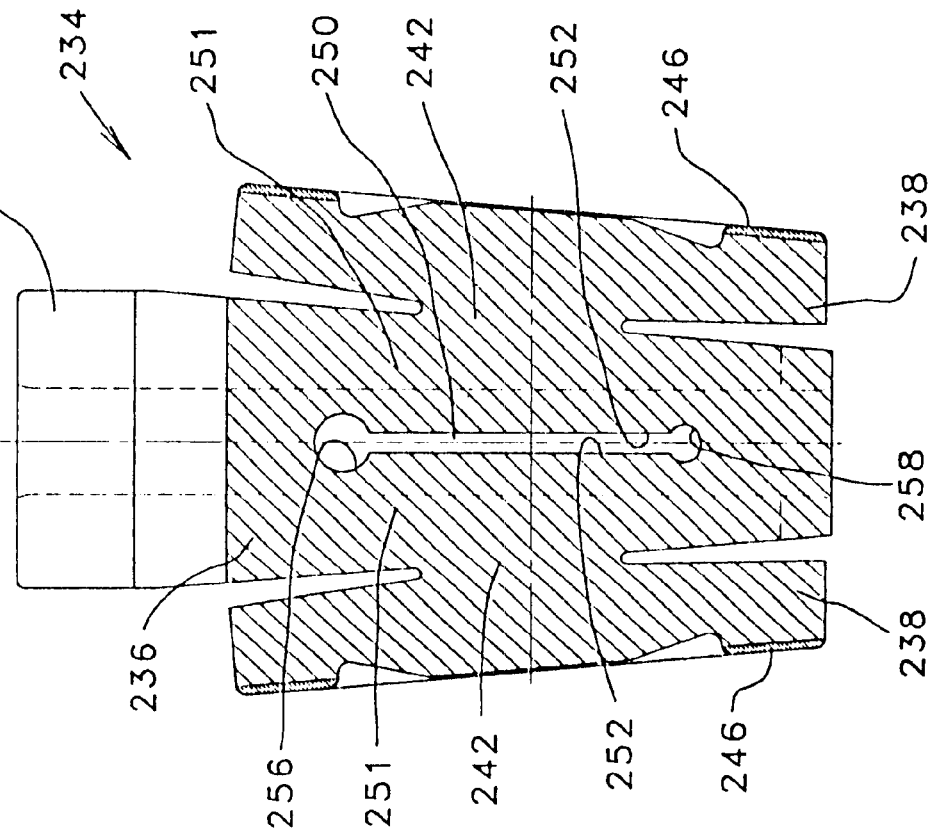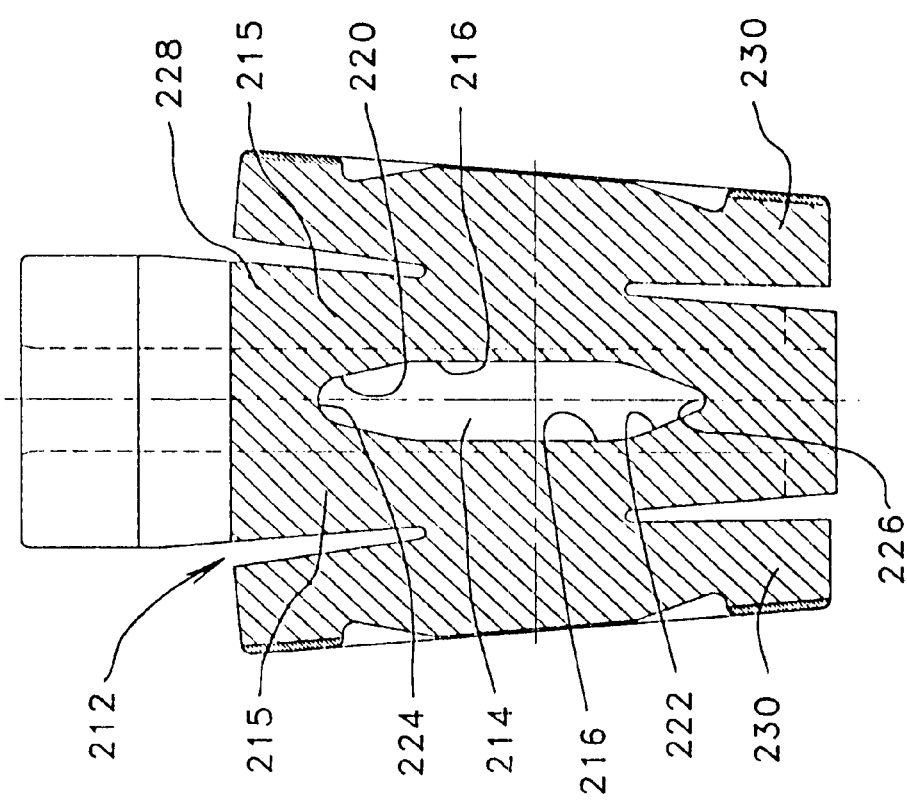

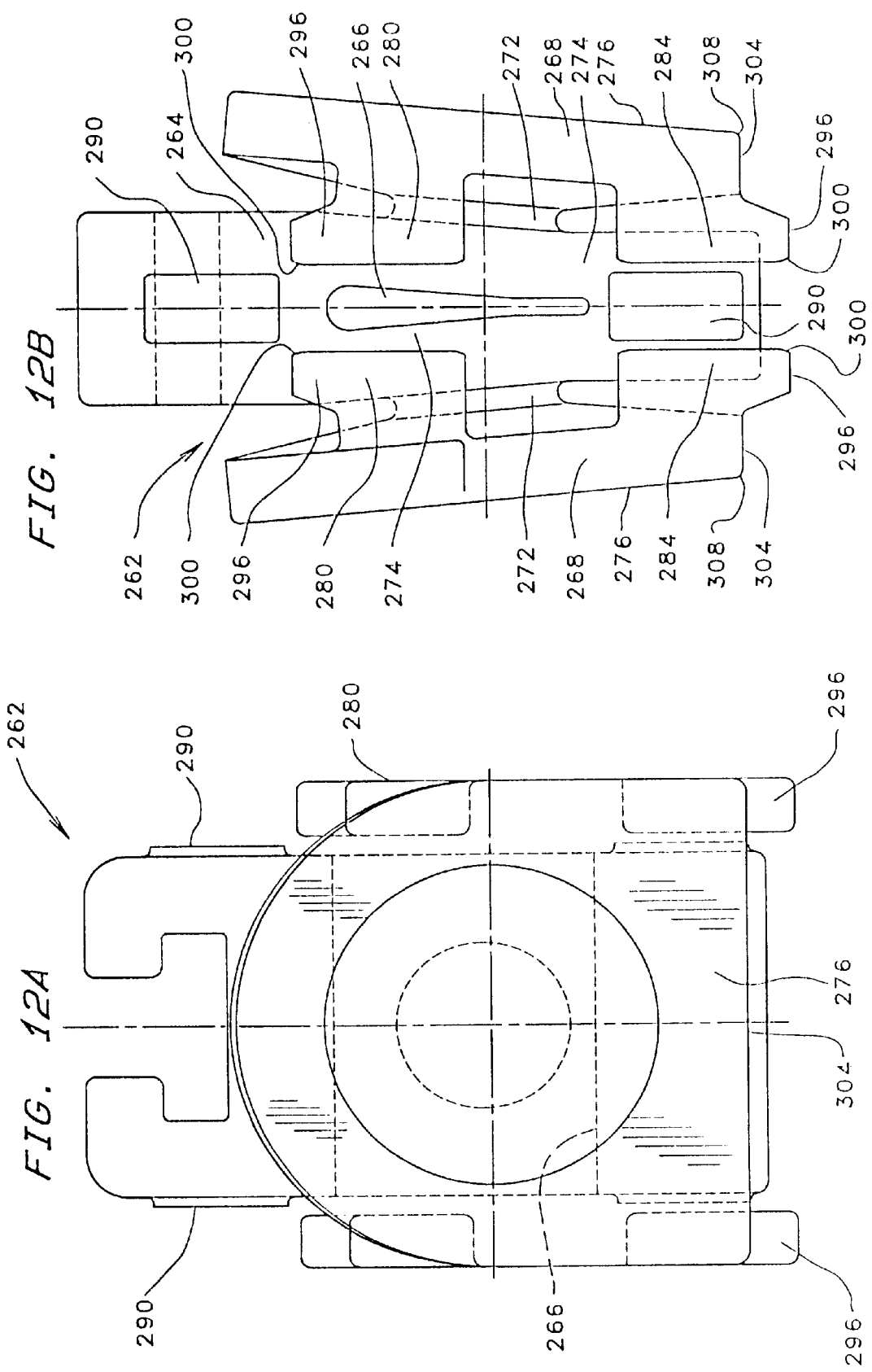

FLEXIBLE WEDGE GATE VALVE

This Appln is a con't of Ser. No. 08/787,454 filed Jan. 22, 1997, abandoned.

FIELD OF THE INVENTION

This invention relates generally to wedge gate valves in fluid flow systems and more specifically concerns flexible wedge gate valves having features to prevent pinching, thermal binding, and overloading due to over-travel, and to prevent damage to valve seats and disks which typically occurs when a wedge gate valve is opened or closed under conditions of high pressure and high fluid flow.

BACKGROUND OF THE INVENTION

The flexible wedge gate valve shown in FIG. 1A (prior art) is the most commonly used isolation valve in critical service applications in nuclear and fossil fuel electric power generation plants and in petrochemical plants where reliable sealing under high temperature is an important requirement. In safety-related systems, these valves are operated by an electric motor actuator, and the valve and actuator assembly is commonly referred to as "motor-operated valve" (MOV).

The closing function of the MOV is achieved by moving the wedge into a seated position that blocks the fluid flow. Motion imparted to the stem by the actuator imparts the necessary opening and closing movement to the wedge. During the opening and closing strokes the motion of the wedge is guided by rails attached to the body which cooperate with slots incorporated in the wedge to constrain the wedge to a linear path and support the load imparted to the wedge by the pressure and flow of the process fluid.

The flexible wedge gate valve provides a metal-to-metal seal between the faces of the seats (which are typically welded to the body in critical service applications) and the seating faces on the wedge, which is also commonly called a "disk" or "gate". The total wedge angle between the two disk faces is relatively small and typically ranges from 6° to 15° in the industry. This relatively small wedge angle provides mechanical advantage and converts the externally applied stem force to a normal force at the seating faces which is much larger than the applied stem force, providing a tight seal across the disk under both high and low differential pressure applications. Compared to solid wedge gate valve designs in which the disk is too stiff to accommodate seat face distortion without adversely affecting sealing ability, the conventional flexible wedge design provides improved sealing capabilities by better accommodating seat face distortion resulting from changes in operating pressures, temperatures, and externally applied forces/moments to the valve ends. Because of its ability to provide a better seal than the solid wedge gates, the flexible wedge gate design has become the most common choice in critical service applications.

In spite of the advantage of better sealing capabilities compared to solid wedge designs, there are several problems with flexible wedge gate valves that have not been overcome by present-day designs:

1. Recent full-scale blowdown tests on several flexible wedge gate valves show that opening or closing operation under high energy flow conditions can inflict severe damage to the disk guide ear elements, body guide rails, and the downstream seat and disk faces, causing a substantial and unpredictable increase in the stem thrust required to operate the valve, which in extreme cases can prevent the valve actuator from fully opening or closing the valve.

2. Closing the valve hot and allowing it cool down can result in a condition commonly referred to as "thermal binding" which can cause even the so-called "flexible" wedge to get stuck in the closed position due to differential temperature between the wedge and valve body at the time of closing and the resulting differential thermal contraction while cooling. The present day flexible wedge gate design evolved from the solid wedge design with the goal of overcoming thermal binding problems, which are most pronounced in solid wedge gate valves. The flexible wedge gate valve designs have not been totally successful in achieving the goal, as evidenced by a number of reports by the United States Nuclear Regulatory Commission (NRC) including NUREG—1275 Vol. 9 and other industry reports. It has been found that the opening thrust can increase substantially and unpredictably in current flexible wedge gate designs when subjected to unfavorable temperature changes. In extreme cases, motor burn-out, motor stall, and damage to the seat faces and stem to disk connection can occur when the electric motor actuator attempts to open a valve that is stuck in the closed position due to thermal binding.

3. External forces and moments applied to the valve ends by the attached piping can cause the faces of the seats (which are welded to the body) to move closer together, distort, and become angularly misaligned with respect to each other. With the disk in the closed position, seat displacements resulting from external forces and moments can lead to "pinching" of the disk and create significant variations (increase or decrease) in the sealing contact force between the disk and seat faces. The current flexible wedge gate valve designs, especially those for high pressure service, do not have sufficient disk flexibility to accommodate such seat face displacements/distortions without a degradation of sealing ability and/or an unpredictable increase in thrust required to open the valve.

4. It is the firm seating of the wedge against the inclined seat surfaces that provides the seat contact stress necessary to initiate sealing. Disk seating is controlled by torque sensitive switches of the valve operator mechanism, rather than by thrust or by actual disk position. Since the stem and disk friction realized in service can be significantly less than the conservative values used for determining the torque switch trip setting, the actual stem thrust can be significantly higher than actually required to wedge the valve and achieve a seal, therefore the gate is subject to being wedged deeper than desired, which can overload the disk and seats. Failure or improper setting of the torque switch can also result in overload of the disk and seats.

The above mentioned problems are discussed in more detail here below to provide an insight into the responsible mechanisms.

During valve operation under high energy flow conditions, conventional flexible wedge gate valve designs can suffer severe damage to the disk, disk guides, and the seats, as shown in the tests conducted by the NRC and reported in NUREG/CR-5406 and NUREG/CR-5558. With the disk in the intermediate travel position, the high flow velocities and high differential pressure across the disk causes high internal reactions at the sliding interfaces of the internal valve components. As the valve is opened or closed under these conditions, severe damage can occur at two distinct locations: (1) at the lower edge of the guide rail to disk guide slot interface, and (2) the disk and downstream seat interface at approximately four o'clock and eight o'clock positions.

The disk-to-guide rail clearances in flexible wedge gate valve designs offered by different manufacturers span a wide range, from as low as 0.020 to 0.040 inch (typically referred to as "tight guide clearance" designs) to as high as 0.20 to 0.30 inch (typically referred to as "large guide clearance" designs). In designs having tight guide clearances and/or long guides, the disk rides on the guides during almost the entire stroke and makes contact with the downstream seat face only in the last 5 to 10 percent of the stroke near the fully closed position. The high differential forces across the disk in the intermediate travel position are transmitted to the guides, resulting in very high peak contact stress at the lower edge of the disk guide slot. The contact stress is high enough to cause severe damage to the guide surfaces, causing a significant and unpredictable increase in the stem thrust required to operate the valve, which may prevent the valve from achieving its fully open or closed position. This type of damage has been found to occur in valves with a short guide length, which allows the disk to tip during travel, as well as in valves with long guide length, in which the disk rides flat on the guide.

In valves with short guides, in addition to guide damage, the disk can tip sufficiently to contact the downstream seat face in the intermediate travel position. This creates a two-point contact between the lower circular end of the disk face and the downstream seat face at approximately four o'clock and eight o'clock positions. Under high differential pressure conditions, the localized contact stress at these two points become extremely high, causing severe plastic deformation, gouging, and machining damage to both the disk and seat faces, which results in a significant and unpredictable increase in the stem thrust required to operate the valve. In extreme conditions, the force requirements become so high that the operator is unable to open or close the valve, thus leading to significant safety concerns in nuclear and fossil fuel power generation plants as well as petrochemical plants.

The thermal binding problems encountered with flexible wedge gate designs are most severe for high pressure valves. The conventional flexible wedge gate valve design uses a one-piece disk in which the pressure boundary plates are connected by a smaller diameter circular hub to provide flexibility. The pressure boundary plates are required to withstand the maximum anticipated differential pressure without exceeding applicable stress limits. In nuclear power plant applications, the disk is required to withstand faulted design pressure conditions, also referred to as maximum pressure or worse case conditions, while maintaining maximum stresses within the applicable code limits, e.g. the American Society of Mechanical Engineers (ASME) Section III Code. This faulted design pressure condition dictates the thickness of the disk pressure boundary plates. For high pressure valves (e.g., ANSI Class 600, 900, or higher), the pressure boundary plate thickness becomes so great that the so-called "flexible" wedge gate designs become extremely stiff (almost as stiff as the solid wedge designs), thus suffering from the same type of thermal problems as those encountered with solid wedge gate valves.

SUMMARY OF THE INVENTION

The objective of the present invention is to provide a novel wedge gate valve construction which prevents damage to guide and sealing surfaces even when the valve is subjected to worst case pressure and flow operating conditions, and which overcomes the typical pinching, thermal binding, and over-travel/over-thrust problems encountered with conventional wedge gate valves.

One of the features of the present invention is to provide a novel flexible wedge gate valve wherein the damage potential at the disk guide slot to body guide rail interface is eliminated by providing novel guide ear elements having flexible cantilever guide end sections which flex elastically and have contoured leading edges, and which serve to minimize localized peak contact stress at the interface with the guide rails of the valve body.

Another feature of the present invention is to provide a flexible wedge disk having much higher flexibility than conventional wedge gate valve designs by incorporation of a novel flexible member interposed between and being integral with opposed pressure boundary plates which provides control of disk flexibility independently of pressure boundary plate thickness, and provides the required disk flexibility without violating Code stress limits.

Another important feature of the present invention is a straight edge at the lower end of the disk faces which greatly increases the contact area between the disk and seat faces at the first instance of contact when closing, and at the last instance of contact when opening, thereby minimizing contact stress and preventing the gouging action common to prior art designs. The straight lower edge is contoured to further minimize peak contact stress.

It is also a feature of the present invention to incorporate an adjustable stem stop to limit the contact force between the disk and seat faces to a desireable range by preventing over-wedging. Over-wedging can result from a combination of inertia effects and a tendancy for the stem and disk friction encountered in actual operation to be significantly lower than the conservative design values used for determining motor operator torque switch trip settings.

Briefly, the present invention overcomes typical thermal binding problems while providing the advantage of a high sealing reliability in both low pressure and high pressure conditions by employing a unique geometry of a one-piece flexible wedge design in which the desired wedge flexibility can be independently achieved while maximum stresses in the disk are kept within the allowable limits, e.g., ASME Section III Boiler and Pressure Vessel Code limits. Unlike the conventional flexible wedge gate design, the disk configuration of this invention is provided with a center section between the two pressure boundary plates which incorporates flexible walls to provide the required disk flexibility without interfering with the Code stress limits.

Throughout much of the opening and closing movement of the disk, the differential pressure load across the disk is transmitted to the body guide rails by disk guide ear elements which define guide slots on opposite sides of the disk. In the present invention the upper and lower ends of the guide ear elements incorporate flexible cantilever guide ends which, compared to the prior art, significantly reduce the peak contact stress between the body guides and the disk guide ear elements. The leading edge geometry of the flexible cantilever guide ends are provided with a transitional contour (such as a radius or chamfer) instead of the usual sharp edge to further reduce peak contact stress. The length and profile of the flexible cantilever guide ends controls the flexibility thereof. The profile of the flexible cantilever guide ends can be uniform in thickness or can be provided with a taper to achieve greater flexibility. By suitable design of the length, profile and leading edge contour of the flexible cantilever guide ends, the localized guide interface peak contact stress is dramatically minimized in comparison with conventional wedge gate valve designs. In the preferred embodiment, the cantilever flexible guide ends are created by the incorporation of relief slots between the guide ear elements and the disk flexible center section.

To limit the depth of seating movement of the flexible disk member and to limit the seating force of the disk against the fixed seats of the valve body, an adjustable stem stop is provided on the threaded valve stem of the preferred embodiment of this invention. This stem stop prevents over-wedging which could otherwise occur due to unpredictably low values of stem thread and disk friction and high inertia effects.

BRIEF DESCRIPTION OF THE DRAWINGS

So that the manner by which the above recited features advantages and objects of the present invention are attained and can be understood in detail, a more particular description of the invention, briefly summarized above, may be had by reference to the embodiments thereof which are illustrated in the appended drawings. It is to be noted, however, that the drawings illustrate only typical embodiments of this invention and are therefore not to be considered limiting of its scope, for the invention may admit to other equally effective embodiments.

In the drawings:

FIG. 2 is a partial sectional view similar to that of FIG. 1A, showing the prior art gate or disk in a mid-travel position, and illustrating tipping of the valve disk under the influence of fluid generated load, and illustrating the resulting contact stress distribution between the disk guide ear elements and the body guide rails.

FIG. 3A is a front elevational view of the disk of a wedge gate valve which incorporates guide ear elements constructed in accordance with the present invention and having a portion thereof broken away and shown in section.

FIG. 3B is a side elevational view of the disk member of FIG. 3A in mid-travel position, showing horizontal fluid load responsive induced tilting of the disk and further showing distribution of contact stress between the flexible cantilever guide ends of the disk and the guide rails of the valve body.

FIG. 3C is a side elevational view of a wedge gate member in mid travel position representing an alternative embodiment of the guide ear elements of the present invention and further showing contact stress distribution between the guide ear elements of the disk and the guide rails of the valve body.

FIG. 5A is a partial sectional view of a wedge gate valve having a pressure boundary plate sealing face incorporating a straight lower edge constructed in accordance with the present invention, which illustrates the disk during the closing stroke at the position where first contact occurs between the disk and the downstream seat.

FIG. 5B is an elevational view showing the disk of the valve of FIG. 5A and showing the downstream seat of the valve in broken line and further showing line contact between the downstream edge of the disk and the sealing surface of the downstream seat.

FIG. 6 is a side elevational view of a wedge gate valve disk which incorporates a slotted center section constructed in accordance with the present invention.

FIG. 9A is a front elevational view of a flexible wedge gate valve disk constructed in accordance with the present invention and representing the preferred embodiment of the disk of the invention which combines the features of FIGS. 3A–3C, 5A and 5B and 6, and which has a part thereof broken away and shown in section.

FIG. 9B is a side elevational view of the flexible wedge disk of FIG. 9A having a part thereof broken away and shown in section.

FIG. 9C is a sectional view taken along line 9C—9C of FIG. 9A.

FIG. 11A is a sectional view of a wedge disk element representing an alternative embodiment of this invention and having a cavity configuration for controlled flexibility of the center section of the disk.

FIG. 11B is a sectional view of a wedge disk element showing an alternate cavity configuration for controlling the flexibility of the center section of the disk which facilitates machining of the cavity.

FIG. 12A is a front elevational view of a flexible wedge gate valve disk suitable for casting and representing an alternate embodiment of the present invention which incorporates guide ear elements attached to the pressure boundary plates.

FIG. 12B is a side elevational view of the disk of FIG. 12A.

GENERAL DESCRIPTION OF THE PRIOR ART

Figure 1A:
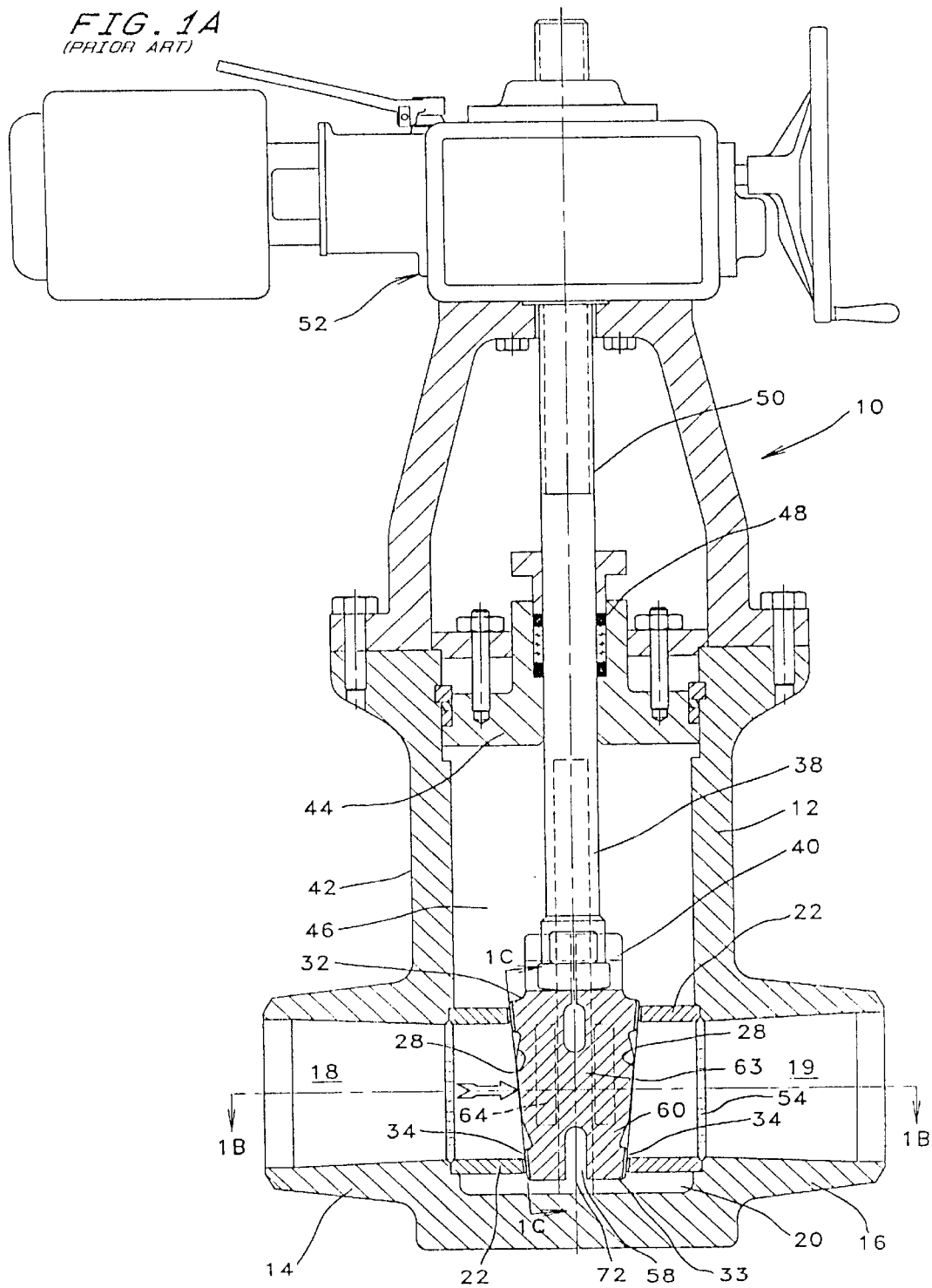
FIG. 1A is a sectional view of a motor-operated flexible wedge gate valve representing the prior art and showing the motorized valve operator thereof in elevation and showing the seated relationship of the gate or disk thereof and further showing the guide rails of the valve body.
Figure 1B:
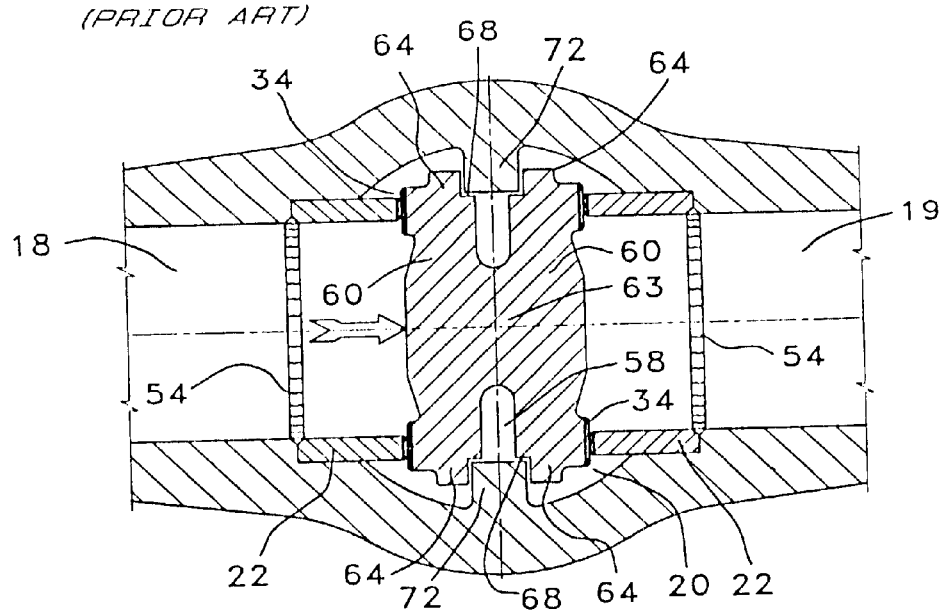
FIG. 1B is a partial sectional view taken along line 1B—1B of FIG. 1A.
Figure 1C:
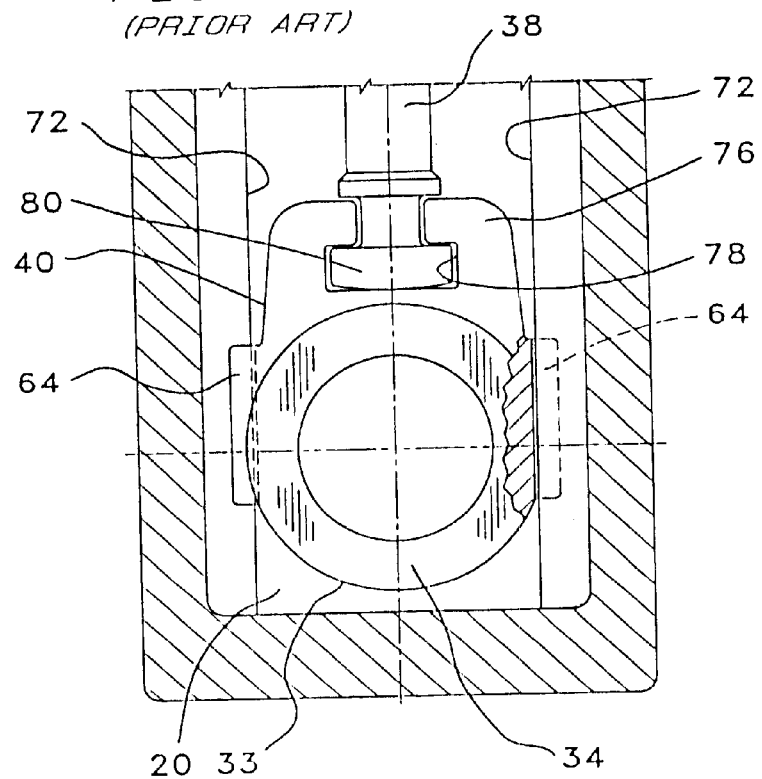
FIG. 1C is a partial sectional view taken along line 1C—1C of FIG. 1A.

Referring now to the drawings and first to FIGS. 1A–1C, for the purpose of general explanation of the characteristics of conventional wedge gate valves, a motor-operated wedge gate valve mechanism is shown generally at 10 which represents the prior art. The valve 10 comprises a valve body 12 having weld end line connection 14 defining upstream flow passage 18 and having weld end connection 16 defining downstream flow passage 19. The valve body defines a valve chamber 20 which is intersected by the flow passages 18 and 19. The circular seat members 22 are located at the juncture of the flow passages with the valve chamber and are each provided with inclined seat surfaces 28, which are oriented in upwardly diverging relation.

A wedge type gate or disk element 32 is provided which has a bottom edge 33 of generally circular or curved configuration as viewed from either of the flow passages and is provided with outwardly directed sealing surfaces 34 for sealing engagement with the respective seat surfaces 28 of the valve seats. A valve stem member 38 is connected to the upper portion of the disk member 32 by a stem/gate connection 40 so that vertical movement of the valve stem causes consequent seating or unseating movement of the wedge shaped disk 32 relative to the fixed seats of the valve body. The stem connection 40 shown in FIGS. 1A and 1C is typically defined by a gate extension 76 having a "T"-slot 78 therein which receives a "T"-shaped disk connection 80 that is defined at the free end of the valve stem 38. The "T"-slot 78 defines force transmitting shoulders which are engaged by corresponding force transmitting shoulders of the "T"-head to impart upward or downward movement to the disk member 32 to open or close the valve.

FIG. 1A shows the valve in the closed position where fluid flow is prevented by the seated disk 32 which obstructs the flow passages 18 & 19. Opening of the disk is accomplished by the valve actuator which imparts movement to the valve stem causing movement of the disk away from the seats so that the flow passages are not obstructed.

The valve stem 38 extends through a packing assembly 48 which prevents leakage of pressurized fluid along the valve stem. An upper portion 50 of the valve stem may be externally threaded as shown or might otherwise be prepared for vertical reciprocation by a motorized valve operator mechanism shown generally at 52.

Typically, the seat elements 22 are secured in welded assembly within the valve body 12 such as by circular welds 54. The disk member 32 typically defines an arcuate lower extremity 33 and defines a central grooved area 58 to provide the gate with some flexibility by essentially dividing it into two integrally connected pressure boundary plate sections 60 connected by hub 63. Boundary plate sections 60 have sealing surfaces 34 thereon. At opposed side portions of the disk spaced pairs of guide ear elements 64 are provided which define guide slots 68 therebetween for receiving guide rails 72 that are located within the valve body. Thus, as the disk member 32 is moved linearly within the valve body toward its open or closed positions by the valve stem 38, it is guided by interaction of the guide ear elements of the gate and the guide rails of the valve body.

When the disk is seated as shown in FIG. 1A the disk is centralized within the valve chamber 20 by the wedging activity of the inclined sealing surfaces of the disk and the corresponding inclined sealing surfaces of the seat members during the seating operation. During disk seating activity prior to reaching the fully closed position shown in FIG. 1A, the disk member is exposed to a horizontal fluid load (represented by an arrow in upstream flow passage 18), and is supported against downstream movement by interaction of the guide ear elements and the body guide rails.

Detailed Description of Prior Art Guide Problems

As shown particularly in prior art FIG. 2, under conditions where the wedge disk member 32 is being moved downwardly to its closed position or is intermediate in its travel from its closed position toward its open position under high pressure, high flow conditions, a significant horizontal fluid load (shown by an arrow in upstream flow passage 18) can be applied to the disk member causing it to be essentially pivoted or shifted laterally about its stem connection so that an angulated relationship is established between the guide rails 72 and the guide ear elements 64. As shown in FIG. 2 the wedge disk 32 has become angulated relative to the guide rails to the extent permitted by the clearance between the guide rails and guide ear elements because the horizontal fluid load is below the lower end of the guide ear elements. (In many prior art wedge gate valves, the horizontal fluid load is below the lower end of the guide ear elements throughout a significant portion of the valve stroke.) When this occurs, a condition of high peak stress is developed between the respective upper and lower ends of the rigid guide ear elements as shown by the stress distribution arrows which collectively represent contact stress resulting from transfer of load from the guide ear elements of the disk to the guide rails of the valve body. As shown by the stress arrows the highest stress occurs at the lower portion of the guide ear elements. Under high fluid load the metal of the guide ear elements can be subjected to plastic deformation at the uppermost and lowermost portions thereof, resulting in galling of the guide surfaces and unpredictably large thrust to operate the valve.

If the guide ear elements of FIG. 2 were longer so that the lower ends of the guide ear elements were positioned lower than the horizontal fluid load so that tilting due to overhung load was eliminated, high peak contact stresses would still be concentrated at the lower end of the guide ear elements throughout much of the stroke, causing plastic deformation, galling, and unpredictably large thrust requirements. In severe cases, gross material loss at the lower ends of the guide ear elements can cause disk tilting even when the guide ear elements are relatively long.

Description of Improvements to Eliminate Guide Damage

In FIG. 3A there is shown a front view of a disk of a wedge gate valve with guide ear elements constructed in accordance with the present invention and shown generally at 80. The disk 80 may be employed within a conventional valve body such as that shown previously in FIG. 1A. In FIG. 3B there is shown a side view of a disk of a wedge gate valve with guide ear elements constructed in accordance with the present invention and shown generally at 80.

The disk 80 incorporates a disk body 82 which is of the same general character as described above in connection with FIGS. 1A, 1B, & 1C in that it is peripherally grooved as shown in broken line at 84 and thus defines pressure boundary plate sections 86 which are interconnected by a central hub 63. At its upper end the disk element defines a connection extension 90 having a T-slot 92 formed therein for receiving the T-head of a valve stem in the conventional manner previously described. The pressure boundary plate sections 86 define respective sealing surfaces 94. These sealing surfaces are disposed in opposed angulated relation with one another in the manner discussed above in connection with FIGS. 1A–1C.

In FIG. 2 the peak stress arrows represent exceptionally high peak contact stress between the guide ear elements 64 and the body guide rails 72 as the disk member is urged downstream by the horizontal fluid load. In FIGS. 3A and 3B pairs of guide ear elements 98 are disposed in spaced relation and define guide slots 100 therebetween. The guide slots 100 receive the respective guide rails 72 of the valve body in the same manner as discussed above in connection with prior art. To minimize the peak stress that occurs between the guide ear elements 98 and the respective guide rails 72, the upper and lower extremities of the guide rails are slotted as shown at 105 thus causing the upper and lower extremities to be flexible cantilever guide ends 106. Thus, as the disk member 80 is subjected to horizontal fluid load as shown in FIG. 3B the lower flexible cantilever guide end of the upstream guide ear element and the upper flexible cantilever guide end of the downstream guide ear element will flex sufficiently to minimize the peak contact stress at the guide interfaces, and thereby prevent the gouging, galling or machining damage between the guide ear elements and guide rails that is common to the prior art. The leading edges 107 of the flexible cantilever guide ends are radiused or otherwise transitionally contoured to further reduce peak contact stress.

In FIG. 3C a wedge gate disk is shown generally at 110 which represents an alternative embodiment of the flexible cantilever guide ends of this invention. The disk 110 is of the same general construction as shown in FIGS. 3A and 3B. Each of the guide ear elements 112 are slotted as shown by broken lines 120 to define tapered or contoured upper and lower flexible cantilever guide ends as shown at 116. Tapering of the flexible cantilever guide ends renders them more flexible as compared to non-tapered flexible cantilever guide ends 106 of FIGS. 3A and 3B. Thus, upon angulation of the disk 110 relative to the guide rails 72 by virtue of the horizontal fluid load, the metal-to-metal sliding contact area between the guide ear elements and the respective guide surfaces of the guide rails will be increased and the localized contact stresses will be reduced as compared with the stiffer non-tapered flexible cantilever guide ends of the embodiment of FIGS. 3A & 3B. The tapered profile effectively minimizes the potential for plastic deformation of the guide ear elements by providing increased flexibility compared to non-tapered flexible cantilever guide ends. Thus, even for short guide ear elements, localized contact stress of the metal surfaces of the guide ear elements and guide rails is minimized due to distribution of the forces over a greater surface area.

Description of Prior Art Disk and Seat Gouging Problem

Figure 4A:
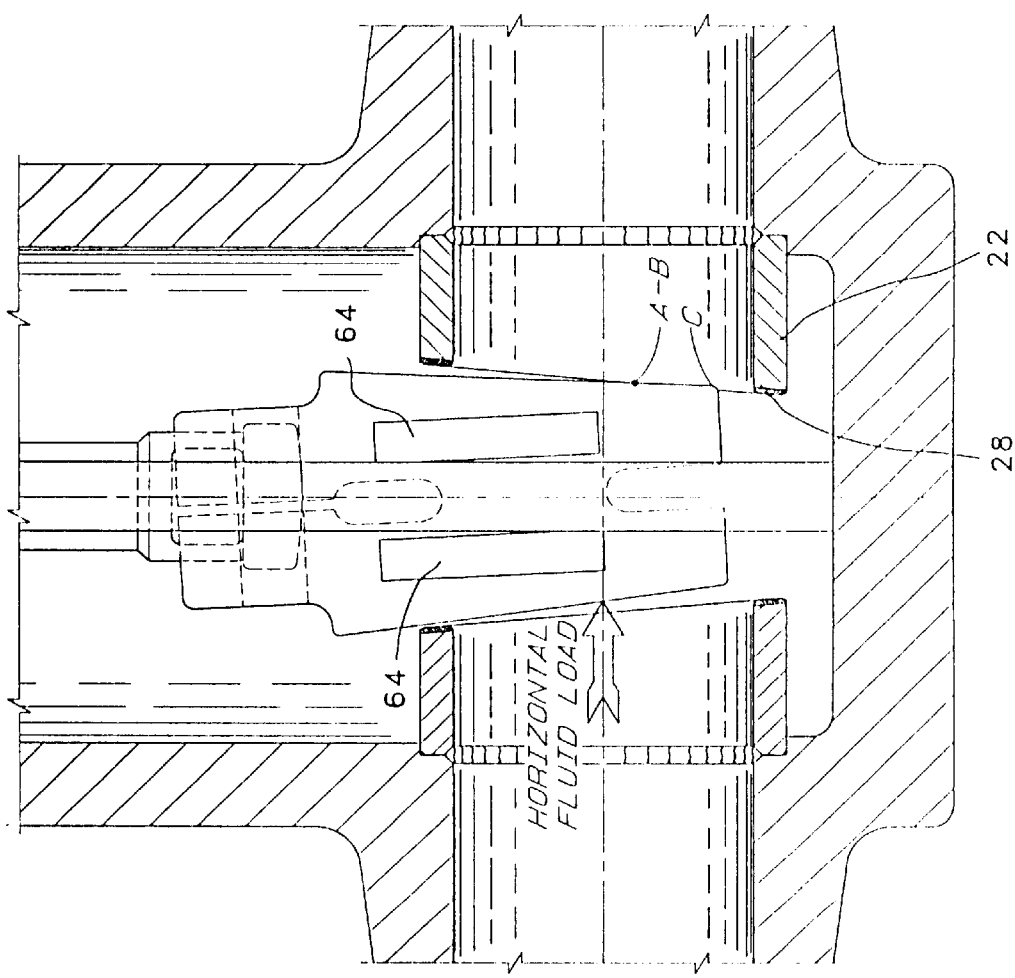
FIG. 4A is a sectional view of a prior art wedge gate valve showing the disk during the closing stroke at the position where first contact occurs between the disk and the downstream seat, and showing tilting of the wedge disk responsive to fluid induced load which positions the lower downstream portion of the wedge disk beyond the plane of the downstream seat, and showing the resulting point contact between the disk and downstream seat.
Figure 4B:
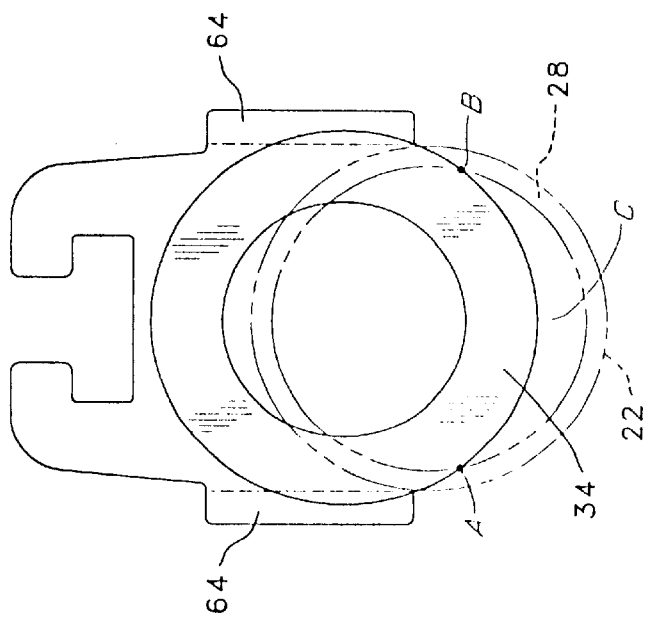
FIG. 4B is an elevational view showing the disk member of FIG. 4A, and showing the downstream seat in broken line and showing point contact between the wedge disk and downstream seat near the four o'clock and eight o'clock positions.

In FIG. 4A, the prior art disk is shown during the closing stroke at the position where point contact first occurs between the disk and the downstream seat at locations A and B. FIG. 4B shows the wedge disk member of FIG. 4A in front elevational view with the downstream seat being shown in broken line.

During valve operation under high energy flow conditions as shown in FIGS. 4A and 4B, conventional flexible wedge gate valve designs can suffer severe damage to the disk, disk guides, and the seats, as shown by the tests conducted by the NRC. With the disk in the intermediate travel position, the high flow velocities and high differential pressure across the disk cause high internal reactions at the sliding interfaces of the valve internal components. As the valve is opened or closed under these conditions, the most severe damage can occur at two distinct locations: (1) at the lower edge of the guide rail to disk guide slot interface as previously described, and (2) the disk and downstream seat interface at approximately four o'clock and eight o'clock positions (shown as points "A" and "B" in FIGS. 4A and 4B ). The disk-to-guide clearances in flexible wedge gate valve designs offered by different manufacturers span a wide range, from as low as 0.020 to 0.040 inch (typically referred to as "tight guide clearance" designs) to as high as 0.20 to 0.30 inch (typically referred to as "large guide clearance" designs). In designs having tight guide clearances and/or long guides, the disk rides on the guides during almost the entire stroke and makes contact with the downstream seat face only in the last 5 to 10 percent of the stroke near the fully closed position.

In valves with short guides, the disk can tip sufficiently to contact the downstream seat face in the intermediate travel position. When this occurs the curved lower edge "C" of the disk will be located beyond the plane of the downstream seat face 30 as is evident from FIG. 4A. This creates a two-point contact between the lower half circumference of the circular disk and the downstream seat at approximately four o'clock, "A", and eight o'clock, "B", positions as shown in FIG. 4B. Under high differential pressure conditions, the localized stresses at these two points become extremely high, causing severe plastic deformation, gouging, and machining damage to both the disk and the seat faces. The damage not only degrades the shut-off capability of the valve, it also results in a significant and unpredictable increase in the stem thrust required to operate the valve. In extreme conditions, the force requirements become so high that the operator is unable to open or close the valve, thus leading to significant safety concerns in the critical applications found in nuclear and fossil power generation plants and petrochemical plants.

Description of Improvements to Eliminate Damage at the Disk-To-Downstream Seat Interface In FIG. 5A, a disk which incorporates the straight bottom of the present invention is shown during the closing stroke at the position where line contact first occurs between the disk and the downstream seat at locations D-E and F-G. FIG. 5B shows the wedge disk member of FIG. 5A in elevational front view with the downstream seat being 30 shown in broken line.

In contrast with the prior art wedge gate or disk shown particularly in FIGS. 4A and 4B, the invention described here eliminates damage at the disk and downstream seat interface by providing pressure boundary plate with a suitably contoured flat bottom sealing face leading edge geometry which eliminates the high localized contact stresses and resulting damage encountered with the circular disk design by providing line contact instead of point contact.

As shown in FIGS. 5A and 5B, a valve disk is provided as shown generally at 130 having a projection 132 that is adapted to receive the T-head 80 of the valve stem 38 in the same manner as described above in connection with the prior art. The wedge disk member 130 defines a disk body 134 having pressure boundary plate sections 136 that are interconnected by a central hub 63 in conventional fashion. The disk body is provided with opposed pairs of guide ear elements 140 which define a recess or slot 143 therebetween for receiving the respective guide rails 72.

Instead of being generally circular as in the conventional flexible wedge gate designs, the pressure boundary plate sealing faces 150 of the present invention have a flat bottom leading edge 148. In addition to being flat, the leading edge corner 154 is transitionally contoured, e.g., by providing a radius or a chamfer at this intersection location. The seating faces on the disk and seats are provided with a hardfacing overlay suitable for sliding under high sealing contact pressures present at the seating interface. The flat bottom at the lower extremity of the disk sealing face ensures that point contact resulting from disk tipping due to the forces and moments imposed on the disk by the fluid flow will not occur.

As shown in FIG. 5A, initial contact of the lower downstream corner 154 of the downstream pressure boundary plate against the downstream seat surface 28 will take the form of line contact rather than point contact, which provides significantly lower contact stress than the point contact of the prior art of FIGS. 4A & 4B. As shown in FIG. 5B, during closing of the valve, the contoured or rounded lower edge of the downstream pressure boundary plate will make initial contact with the downstream seat surface 28 along line D-E at the 8 o'clock position of the seat surface and along line F-G at the 4 o'clock position on the seat surface 28, and the center C does not project beyond the seat face plane 28. This contoured edge in contact with the flat seat surface 28 significantly minimizes the peak stress that occurs between the disk and the seat surfaces, which minimizes the potential for the disk or the seat to become damaged as the straight edge 154 moves along the seat surface during opening or closing movement. By virtue of the flat lower portion of the disk and its substantially straight downstream corner 154, it is not possible for the lower portion of the gate to cross the plane of the downstream seat surface. This feature ensures that contact between the downstream edge of the disk and the sealing surface of the valve seat is line contact rather that point contact. Thus the gouging effect that exists when the prior art embodiment of FIGS. 4A and 4B is employed does not occur when the flat bottom embodiment of the present invention is employed as shown in FIGS. 5A and 5B hereof.

Description of Prior Art Disk Pinching/Binding Problems

Referring again to FIGS. 1A–1C, the prior art wedge gate valve 10 provides an upper valve body section 42 which is closed and sealed by a bonnet member 44 being is secured to the valve body by bolts as shown or in any suitable manner. The upper valve body section 42 defines a bonnet chamber 46 which is filled with the process fluid being controlled by the valve. In the open condition of the valve, the disk member 32 will be retracted to a position within the bonnet chamber. Under circumstances where the fluid being controlled by the valve is of high temperature, the fluid in the bonnet chamber, being somewhat isolated from the flow path through the valve, is at lower temperature as compared with the temperature of the fluid in the flow passages 18 and 19. A condition of thermal binding can occur when the valve disk 32 is subjected to this lower temperature and is then wedged into seated engagement if the valve is then allowed to cool to a given lower temperature, because the valve body thermally contracts more than the disk owing to its higher initial temperature.

The stem connection 40 shown in FIGS. 1A and 1C is typically defined by a gate extension 76 having a "T"-slot 78 therein which receives a "T"-shaped disk connection 80 that is defined at the free end of the valve stem 38. The "T"-slot 78 defines force transmitting shoulders which are engaged by corresponding force transmitting shoulders of the "T"-head to impart upward or downward movement to the disk member 32 to open or close the valve. In the event the disk should become bound in its closed position such as by thermal binding, application of force by the valve operator to the valve stem 38 to move the disk can impart sufficient force between the force transmitting shoulders of the "T"-head of the valve stem and the upper connection portion of the disk to yield the "T"-head and/or the upper portion of the disk to the point that stem/gate separation can occur.

External forces and moments applied to the valve ends 14 & 16 by the attached piping (not shown) can cause the opposing faces 28 of the seats 22 to move closer together, distort, and become angularly misaligned with respect to each other. With the disk in the closed position, seat displacements resulting from the external forces and moments can lead to "pinching" of the disk and create significant variations (increase or decrease) in the sealing contact force between the disk and seat faces. The current flexible wedge gate valve designs, especially those for high pressure service, do not have sufficient disk flexibility to accommodate such seat face angular displacements/distortions without a degradation of sealing ability and/or an unpredictable increase in thrust required to open the valve.

Description of Improvements to Eliminate Disk Pinching/Binding Problems

In FIG. 6 a side elevational view of a of a wedge gate valve disk is shown which incorporates a slotted center section constructed in accordance with the present invention to prevent the disk pinching and thermal binding problems common to prior art valves. The improved disk 330 of this invention is of single-piece, integral construction (forged or cast) which consists of two pressure boundary plates 332 that are integrally connected to a center section 344 of the disk by smaller diameter cylindrical hub sections 346. The pressure boundary plate sections 332 defining respective sealing surfaces 336 which are disposed in angulated relation with one another in the manner discussed above in connection with the prior art of FIGS. 1A–1C. At its upper end the disk element defines a stem connection extension 340 having a T-slot 342 formed therein for receiving the T-head of a valve stem in the conventional manner previously described above in connection with FIGS. 1A–1C.

A longitudinal internal cavity or slot 350 that is preferably longer than the cylindrical hubs 346 and which preferably penetrates completely from one side to the other of the center section 344, serves to define flexible walls 352 on both sides of the cavity 350 that impart extra flexibility to the disk to prevent the previously described pinching and thermal binding common to prior art flexible wedges of more rigid design. It can be appreciated that while the internal cavity 350 is transverse in nature and penetrates completely from one side to the other of the center section 344, a vertical slot which penetrates completely from top to bottom of the center section 344 would have equivalant functionality. The internal cavity 350 is located substantially centrally of the disk center section 144 and remote from the stem connection of the disk center section.

At opposed side portions of the disk center section 344 spaced pairs of guide ear elements 356 are provided which define guide slots therebetween for receiving respective guide rails that are located within the valve body in the conventional manner previously described above in connection with FIGS. 1A–1C.

Description of Prior Art Over-Travel Problems

Wedge gate valve actuator size selection is determined by using conservative values for stem and disk friction, and by the need to develop the required minimum thrust under degraded voltage conditions. On the closing stroke the actual output thrust, and the resulting wedged seating position of the gate, is controlled by a torque switch which shuts off the actuator motor when a given torque value is reached. The torque switch setting is determined with the above mentioned conservative friction and voltage factors in mind to help ensure closure of the valve. Since the stem thread friction and disk friction realized in service is usually much lower than the conservative design values used to determine torque switch trip settings, under non-degraded voltage conditions the actual stem thrust can be substantially higher than actually required to close the valve and achieve a satisfactory seal. The gate is therefore subject to being wedged deeper than needed or desired, which can overload the disk and seats, especially when pinching or thermal binding conditions are combined with over-travel conditions. Improper setting or failure of the torque switch can also result in severe overload of the disk and seats by exposing them to the full stall torque of the actuator.

Description of Improvements to Minimize Over-Travel

Figure 7:
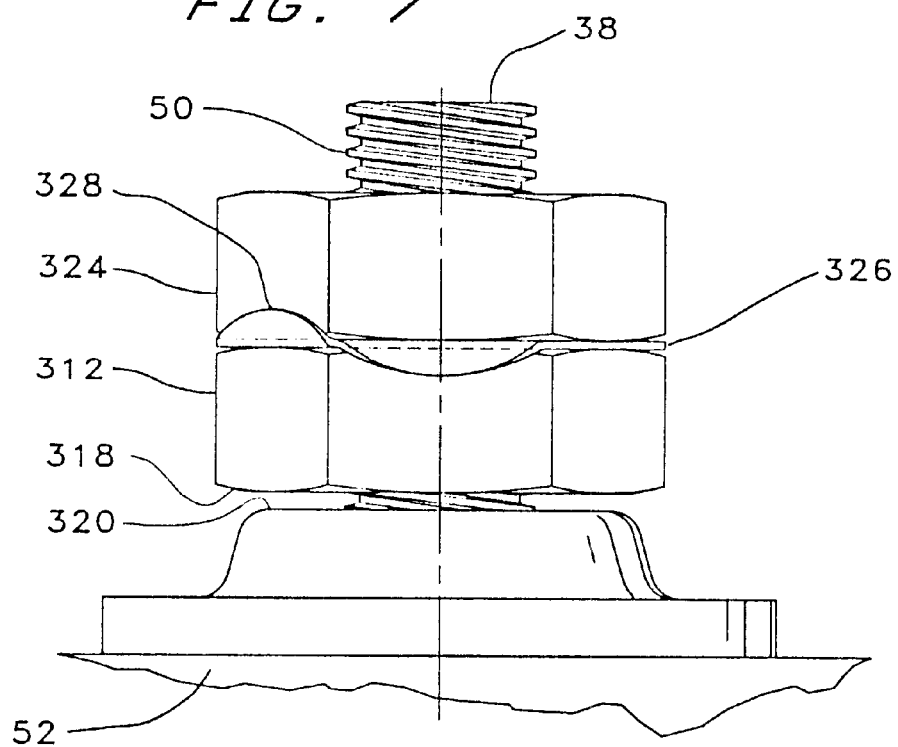
FIG. 7 is a fragmented side view of a flexible wedge gate valve showing an adjustable stem stop element for use in limiting downward over-travel of the flexible disk element of the wedge gate valve mechanism of this invention.

Referring now to FIG. 7, a partial elevational view of the stem 38 is shown as it projects above the top of the actuator 52. To limit disk over-travel when low stem thread and disk friction is encountered, a stem downstop member 312 is threadedly received by the upper threaded end 50 of the valve stem 38 and may be secured in any desired position along the threaded valve stem by jam nut 324 by holding the stem downstop member 312 stationary and imparting a preloading torque to the jam nut 324 to bind the downstop member and jam nut to the stem. To further secure the stem downstop member 312 in position, a circular locking ring 326 is interposed between the stem downstop member 312 and the jam nut 324; after the jam nut preload has been applied, exposed edge portions 328 of circular locking ring 326 are plastically deformed against flat surfaces of the stem downstop member and jam nut, interlocking them to prevent relative rotation.

The downstop member 312 defines a lower stop shoulder 318 which is oriented for stopping engagement with an upwardly facing stop surface 320 of the valve actuator 52. By selectively adjusting the position of the downstop relative to the threaded valve stem, over-travel of the disk can be limited.

Figure 8:
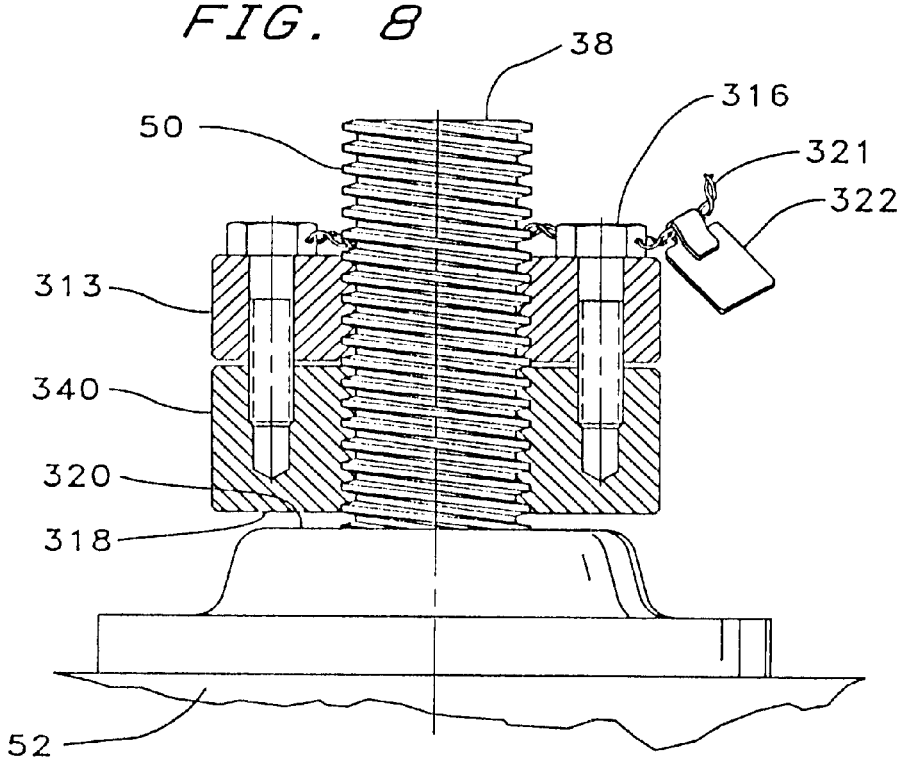
FIG. 8 is a fragmented section view of a flexible wedge gate valve showing an adjustable stem stop element of preferred embodiment for use in limiting downward over-travel of the flexible disk of this invention.

The downstop member of the present invention may be secured in the desired position along the threaded valve stem by any suitable locking means. An alternate downstop locking means is shown in FIG. 8, wherein the downstop member 340 is drilled and tapped to receive locking bolts 316 which when preloaded, clamp both the downstop and lock nut 313 to the threads of the valve stem. To ensure against loosening of the locking bolts and to ensure against tampering with the downstop setting, a security wire 321 extends through drilled passages in the bolt heads and is sealed with a security tag 322 which is applied at the time the downstop is positioned and secured.

The downstop embodiment portrayed in FIG. 8 is more suitable for large diameter valve stems and multiple start stem threads than the embodiment of FIG. 7 because the multiplicity of locking bolts of FIG. 8 require a lower applied torque level to achieve the required level of axial preload compared to the jam nut of FIG. 7, and therefore represents the preferred downstop embodiment.

DETAILED DESCRIPTION OF PREFERRED EMBODIMENT

The preferred embodiment of the improved valve assembly of the present invention combines a disk as shown in FIGS. 9A, 9B & 9C and the stem downstop member described above in conjunction with FIG. 8 which are adapted to be installed within the conventional valve/actuator arrangement typified by FIG. 1A. FIG. 9A is a front view of the preferred disk embodiment, FIG. 9B is a side view, and FIG. 9C is a sectional view taken along line 9C—9C of FIG. 9A.

The preferred embodiment of the improved disk of this invention, being shown generally at 160 is of single-piece, integral construction (forged or cast) which consists of two pressure boundary plates 162 that are integrally connected to the center section 166 of the disk by smaller diameter hub sections 168. As shown in FIG. 9B, the sealing faces 163 of the two pressure boundary plates are oriented in downwardly converging relation and define a wedge shape similar to that in the conventional wedge gate valve design. The preferred wedge angle used is approximately 10°, but may vary from 10° as is common in the industry.

A longitudinal internal cavity 172 that is in the form of an internal slot having a length, being the dimension taken along the vertical centerline shown in FIG. 9B, and which is less than the length of the pressure boundary plates 162 and is preferably greater than the diameter of the hubs 168 and which preferably penetrates completely from one side to the other of the center section 166, serves to define flexible walls 180 on both sides of the cavity 172. Said flexible walls 180 impart extra flexibility to the disk to prevent the previously described pinching and thermal binding common to prior art flexible wedges of more rigid design. The upper portion of the disk center section defines a stem connection which, in this case is shown to be a T slot connection which receives a T member at the end of a valve stem to establish driving connection of the valve stem with the valve disk.

In the preferred disk embodiment, as best shown in FIG. 9C, the center section of the disk is provided with two rectangular shaped guide slots 174 that extend along the entire vertical length of the disk, and which are defined by guide ear elements 178. The differential pressure load across the disk is transmitted to the body guide rails, such as previously shown at 72 in FIGS. 1A–1C, by the upstream disk guide ear elements 178. Relief slots 186 are defined between the pairs of spaced guide ear elements 178 and the disk center section 166 at the lower edge of the guide ear elements to create flexible cantilever guide ends 180 which can elastically flex independently of the center section 166. Furthermore, the leading edge geometry of the flexible cantilever guide ends is provided with a transitional contour (such as radius or chamfer) as shown at 190 in FIG. 9B instead of a sharp edge to further minimize peak contact stress at the interface of the guide ear elements with the guide rails of the valve body. The elastic flexibility of the flexible cantilever guide ends is controlled by the depth of the slot and the thickness of the guide ear elements. The thickness of the flexible cantilever guide ends can be uniform or provided with a taper (as shown in FIG. 9B) to achieve enhanced flexibility. By suitable design of the flexible cantilever guide end length and profile, the localized peak contact stress at the guide ear element to guide rail interface is dramatically minimized in comparison with the localized peak stress common to prior art valves. Furthermore, the guide rail-to-disk guide slot interface is provided with a hardfacing overlay which, in conjunction with the dramatically reduced contact stresses, is capable of providing reliable operation even under high differential pressures associated with high energy blowdown conditions without causing damage to the guide rails. Furthermore, the length and position of the guide ear elements is such that the horizontal fluid load can never be below the guiding surfaces, and therefore tipping of the disk can not occur.

The bottom corners 167 of the respective pressure boundary plate sealing faces are straight, rounded, smoothly contoured corners which are disposed for contact with the respective seat surfaces of the valve seats in the manner that is described above in connection with FIGS. 5A and 5B. This straight, smoothly contoured bottom edge feature prevents the lower downstream edge of the downstream pressure boundary plate from crossing the plane of the downstream seat and eliminates the high localized contact stresses encountered with the circular prior art disk design by providing initial line contact between the sealing faces of the disk and seat.

DESCRIPTION OF ALTERNATE EMBODIMENT

Figure 10A:
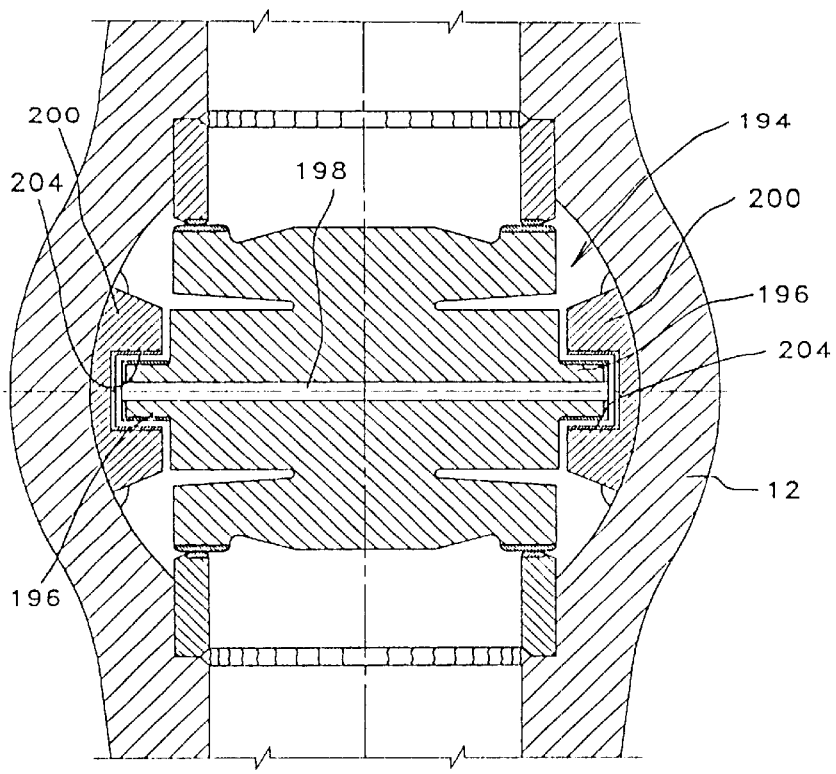
FIG. 10A is a sectional view of a wedge gate valve having a flexible disk element and representing an alternative embodiment of this invention having guide slots in the valve body and guide tangs being defined by the wedge disk element.
Figure 10B:
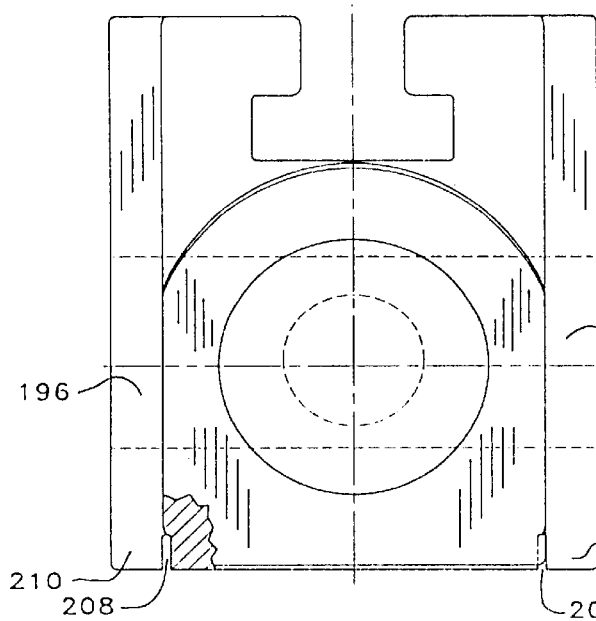
FIG. 10B is a front elevational view of the flexible wedge disk member of the wedge gate valve mechanism of FIG. 10A having a part thereof broken away and shown in section.
Figure 10C:
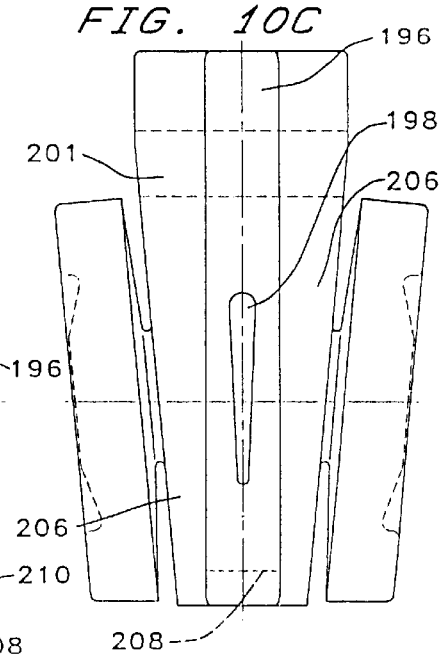
FIG. 10C is a side elevational view of the wedge disk member of FIG. 10B.

Even though FIGS. 9A–9C illustrate a guide slot in the disk for use with a body guide rail of the type shown in FIG. 1A, an alternate embodiment may be provided, as shown in FIGS. 10A–10C, in which the disk shown generally at 194 has tang-like projections 196 and the body 12 is provided with intermittent guide slot elements 200 which define guide slots 204 that receive the respective guide tang projections 196 of the disk in movable relation therein. In the alternate embodiment of FIGS. 10A–10C disk guide flexibility for minimizing peak contact stress is accomplished by providing relief slots 208 at the lower edges of the guide tang projections of the disk which create flexible cantilever guide ends 210. This disk and disk guide arrangement is equally effective in eliminating guide damage problems. A transverse cavity 198 through the center section 201 of the disk creates flexible walls 206 to control disk flexibility and prevent pinching and thermal binding. The sealing faces of the pressure boundary plates have flat contoured bottom leading edges as previously described to prevent gouging.

As shown in FIGS. 11A and 11B, the flexibility of the wedge gate or disk construction may be efficiently controlled by variation of the dimensions and geometry of the internal transverse cavity thereof. As shown in FIG. 11A the disk shown generally at 212 defines a rather wide internal transverse cavity 214 having essentially parallel intermediate spaced wall surfaces 216 and defining upper and lower converging internal wall surfaces as shown at 220 and 222. The converging upper internal wall surfaces 220 merge into a rounded upper surface 224. The lower converging wall sections 222 converge with an internal rounded surface 226 having a smaller radius of curvature as compared with the curved surface 224. The geometry of the internal transverse cavity 214 effectively controls the sectional modulus of the flexible wall 215 portions of the disk body center section 228 and thus effectively controls the transition of forces from the pressure boundary plates 230 to the center section of the disk as well as controlling the flexibility of the disk center section. The center section can thus be rendered more or less flexible by variation of the dimension and geometry of the internal transverse cavity.

As shown in FIG. 11B the disk arrangement shown generally at 234 provides a central disk section 236 of slightly less flexibility as compared with the disk geometry 212 of FIG. 11A. Pressure boundary plates 238 are connected to the central body section 236 by hub sections 242 and define converging sealing surfaces 246. The central body section is provided with a transverse internal cavity 250 defining flexible walls 251. The transverse internal cavity 250 is made quite narrow by substantially parallel opposed internal surfaces 252. At the upper and lower extremities of the internal transverse cavity 250 there are provided curved or radiused enlargements 256 and 258 which serve as pilot holes for the machining operation used to create the parallel cavity 250, and which also serve as stress relief radii for the ends of the cavity to preclude fatigue damage. These radiused enlargements minimize localized internal bending stress concentration as the flexible walls 251 are flexed. The upper portion of the disk center section is provided with a conventional T-slot stem connection 260. The guide ear element and guide slot arrangement of both the disks of FIGS. 11A and 11B may conveniently take any suitable form, such as that discussed above in connection with FIGS. 9A–9C or FIGS. 10A–10C.

The flexible walls of the central disk section of the present invention can be created by means other than a longitudinal slot that penetrates completely from one side to the other of the central disk section. For example, a closed centrally located cavity such as shown in FIG. 11A can be formed into the center section of the disk by casting, or by welded connection of disk halves, and can take circular form or any other suitable hollow configuration.

Another alternate disk embodiment of the present invention, which provides for elastically flexible cantilever guide ends attached to the pressure boundary plates, and which is suitable for cast disk design, is shown in front view in FIG. 12A and in side view in FIG. 12B.

The disk shown generally at 262 defines an integral disk center section 264 having a transverse internal cavity 266 defining flexible walls 274 for controlling the flexibility of the disk center section. The transverse internal cavity of the disk center section may also conveniently take the form shown in FIGS. 11A or 11B or may have any other suitable configuration as desired. Pressure boundary plates 268 are connected to the disk center section by circular hubs 272. The pressure boundary plates define downwardly converging sealing surfaces 276 for sealing engagement with the mating tapered internal seats of the valve body. To provide for guiding of the disk during its opening and closing movement, opposed upper guide ear elements 280 are integral with and extend from an upper portion of the pressure boundary plates while opposed guide ear elements 284 are integral with and extend from respective lower portions of the pressure boundary plates.

As shown particularly in FIG. 12B both the upper and lower pairs of disk guide ear elements incorporate flexible cantilever guide ends 296 to provide for controlled flexibility at the respective free extremities thereof. This flexibility efficiently minimizes localized peak contact stress at the interface thereof with the guide rails of the valve body in much the same manner as described previously in connection with FIGS. 3A, 3B and 3C. The leading edge geometry of the flexible cantilever guide ends are provided with a smooth contour 300 to further reduce peak contact stress. The length and profile of the flexible cantilever guide ends controls the flexibility thereof. The profile of the flexible cantilever guide ends can be uniform in thickness or can be provided with a taper (as shown) to achieve greater flexibility.

The lower guide ear elements 284 are positioned at the lower end of the pressure boundary plates so that the horizontal fluid load can never be below the guiding surfaces and cause tipping of the disk. The upper guide ear elements 280 are spaced separate from the lower guide ear elements 284, rather than existing as one continuous guide ear element, so that they have minimal effect on pressure boundary plate flexibility.

The disk center section 264 is provided with upper and lower lateral guide pads 290 on opposed sides thereof. These guide pads may be provided with hard facing overlay material if desired to minimize any wear that might otherwise occur from contact with the body guide rails. The guide pads 290 perform a lateral positioning function and are not be subject to significant contact stress because they are oriented in substantially parallel relation with the direction of horizontal fluid load.

The bottom surfaces 304 of the pressure boundary plates 268 are flat and define respective rounded, smoothly contoured corners 308 which are disposed for contact with the respective seat surfaces of the valve seats in the manner that is described above in connection with FIGS. 5A and 5B. This straight, smoothly contoured bottom edge feature prevents the lower downstream edge of the downstream pressure boundary plate sealing face from crossing the plane of the downstream seat and eliminates the high localized contact stresses encountered with the circular disk design by providing line contact with the seat face.

In view of the foregoing it is evident that the present invention is one well adapted to attain all of the aforementioned objects and features, together with other objects and features that are inherent in the apparatus that is disclosed herein.

As will be readily apparent to those skilled in the art, the present invention may be produced in other specific forms without departing from its spirit or essential characteristics. The present embodiments are therefore to be considered only as illustrative and not restrictive, the scope of the invention being indicated by the claims rather than by the foregoing description, and all changes which come within the meaning and range of the equivalence of the claims are therefore intended to be embraced therein.

What is claimed is:

1. A wedge gate valve mechanism, comprising:
   (a) a valve body having an internal valve chamber and flow passages intersecting said valve chamber and having planar, upwardly diverging circular seat surfaces being defined at the intersection of said valve chamber and flow passages, said valve body having guide means therein;
   (b) a valve disk having a closed and fully seated position located between and in sealing engagement with said circular seat surfaces and an open position unseated from said circular seat surfaces, said valve disk comprising:
      (1) a disk center section having at least one cavity located therein and defining a pair of flexible disk walls being spaced by said at least one cavity, said at least one cavity being unobstructed and said flexible disk walls being flexible at all positions of said valve disk and at said closed position of said valve disk being flexible toward one another responsive to thermal contraction of said valve body to minimize thermal binding of said valve disk, said disk center section defining top and bottom ends and having opposed sides oriented in substantially transverse relation with said flexible disk walls, said at least one cavity being located substantially centrally of said disk center section and between said opposed sides and between said top and bottom ends of said disk center section;
      (2) a pair of hubs each being integrally connected with a respective one of said pair of flexible disk walls and having said cavity of said disk center section located therebetween, said pair of hubs being moveable toward one another at said closet and fully seated position of said valve disk responsive to thermal contraction of said valve body for minimizing thermal binding of said valve disk; and
      (3) a pair of pressure boundary plates each being integrally connected to and supported by a respective one of said hubs and having a sealing surface thereon, said sealing surfaces of said pressure boundary plates being oriented in downwardly converging relation for sealing engagement with said upwardly diverging circular seat surfaces, said pressure boundary plates being flexible at all positions of said valve disk;
   (c) disk guide means being located on opposed side portions of said valve disk and being disposed in disk guiding relation with said guide means of said valve body;
   (d) a stem connection being defined by said valve disk and being disposed in offset relation with said flexible disk walls and said at least one cavity; and
   (e) a valve stem having linear driving relation with said stem connection for moving said valve disk to said open and closed positions.

2. The improvement of claim 1 wherein:
said slot passing transversely through said disk center section to define said flexible walls.

3. The improvement of claim 1 wherein:
said slot being a substantially closed and unobstructed space within said disk center section.

4. A wedge gate valve mechanism comprising:
   (a) a valve body having an internal valve chamber and flow passages intersecting said valve chamber and having planar, upwardly diverging circular seat surfaces being defined at the intersection of said valve chamber and flow passages, said valve body having guide means therein;
   (b) a valve disk having a closed position located between and in sealing engagement with said circular seat surfaces and an open position unseated from said circular seat surfaces, said valve disk being flexible at both said open and closed positions to minimize thermal binding of said valve disk relative to said valve body under conditions where said valve disk is closed and seated and where said valve body thermally contracts more than said valve disk, said valve disk comprising:
      (1) a disk center section having at least one slot of predetermined length located substantially centrally therein and defining a pair of opposed generally planar flexible disk walls being spaced by said at least one slot, said flexible disk walls being unobstructed and flexible at all positions of said valve disk and permitting movement of said opposed flexible disk walls toward one another to minimize thermal binding thereof by said valve body;
      (2) a pair of hubs each being integrally connected with a respective one of said pair of flexible disk walls and having said slot of said disk center section located therebetween, said hubs having a predetermined dimension, said predetermined length of said slot of said disk center section being greater than said predetermined dimension of said hubs, said pair of hubs being moveable toward one another at said closed and fully seated position of said valve disk responsive to thermal contraction of said valve body for minimizing thermal binding of said valve disk;

(3) a pair of pressure boundary plates establishing boundary plate height length and width and being integrally connected to and supported by a respective one of said hubs and having a sealing surface thereon said length of said pressure boundary plates exceeding said predetermined length of said slot, said sealing surfaces of said pressure boundary plates being oriented in downwardly converging relation for sealing engagement with said upwardly diverging circular seat surfaces, when said valve disk is located at said closed position and fully seated said flexible disk walls and said pressure boundary plates being flexible toward one another responsive to thermal contraction of said valve body for minimizing thermal binding of said valve disk;

(c) disk guide means being located on opposed side portions of said valve disk and being disposed in disk guiding relation with said guide means of said valve body;

(d) a stem connection being defined by said valve disk and being located offset from said slot and said flexible disk walls; and (e) a valve stem having driving engagement with said stem connection for moving said valve disk to said open and closed positions.

5. A wedge gate valve mechanism comprising:

(a) a valve body having an internal valve chamber and flow passages intersecting said valve chamber and having planar, upwardly diverging circular seat surfaces being defined at the intersection of said valve chamber and flow passages, said valve body having guide means therein, said wedge gate valve mechanism further having actuation means for opening and closing movement thereof;

(b) a valve disk having a closed position located between and in sealing engagement with said circular seat surfaces and an open position unseated from said circular seat surfaces, said valve disk comprising:

(1) a disk center section having at least one cavity located therein and defining a pair of flexible disk walls being spaced by said cavity, said disk center section defining top and bottom ends and opposed sides oriented in substantially transverse relation with said pressure boundary pressure plates; and having opposed internal surfaces within said disk center section defining said cavity and defining said opposed internal surfaces of said flexible walls of said disk center section, said opposed internal surfaces intersecting each of said opposed sides of said disk center section and defining a transverse slot extending centrally through said disk center section and having slot openings at each of said opposed sides of said disk center section;

(2) a pair of hubs each being integrally connected with a respective one of said pair of flexible disk walls and having said cavity of said disk center section located therebetween; and (3) a pair of pressure boundary plates each being integrally connected to and supported by a respective one of said hubs and having a sealing surface thereon, said sealing surfaces of said pressure boundary plates being oriented in downwardly converging relation for sealing engagement with said upwardly diverging circular seat surfaces, said flexible disk walls and said pressure boundary plates being movable toward said cavity responsive to thermal contraction of said valve body when said valve disk is at said closed position; and (c) disk guide means being located on opposed side portions of said valve disk and being disposed in disk guiding relation with said guide means of said valve body.

6. The improvement of claim 5, further comprising:

said stem connection being defined by said pressure boundary plates of said valve disk and receiving said valve stem in driving relation therewith.

7. The wedge gate valve mechanism of claim 5, wherein:

said stem connection being a "T"-Slot adapted for driven connection with said valve stem.

8. The improvement of claim 5, wherein said flexible disk walls are of variable thickness to optimize the flexible nature thereof.

\* \* \* \* \*

UNITED STATES PATENT AND TRADEMARK OFFICE
CERTIFICATE OF CORRECTION

PATENT NO. : 6,338,469 B1
DATED : January 15, 2002
INVENTOR(S) : Manmohan Singh Kalsi, Patricio Daniel Alvarez and Jaw-Kuang Wang It is certified that error appears in the above-identified patent and that said Letters Patent is hereby corrected as shown below:

<u>Column 18,</u>
Line 2, delete "closet", insert -- closed --.

Signed and Sealed this

Eleventh Day of June, 2002

*Attest:*

JAMES E. ROGAN
*Attesting Officer*    *Director of the United States Patent and Trademark Office*